United States Patent [19]

Howe et al.

[11] 4,432,341

[45] Feb. 21, 1984

[54] SOLAR HEATER AND ROOF ATTACHMENT MEANS

[75] Inventors: Gary L. Howe, Mankato; Samuel G. Koutavas, Faribault, both of Minn.

[73] Assignee: Future Tech, Inc., Mankato, Minn.

[21] Appl. No.: 489,867

[22] Filed: May 5, 1983

Related U.S. Application Data

[63] Continuation-in-part of Ser. No. 375,366, May 6, 1982, abandoned.

[51] Int. Cl.³ ............................................. F24J 3/02
[52] U.S. Cl. .................................. 126/417; 52/11; 126/450; 165/47
[58] Field of Search .................. 126/417, 449, 450; 165/47, 48 S; 52/11, 12, 13, 14, 15, 16

[56] References Cited

U.S. PATENT DOCUMENTS

| | | | |
|---|---|---|---|
| 2,111,251 | 3/1938 | Spilsbury | 108/26 |
| 2,780,415 | 2/1957 | Gay | 237/2 |
| 2,998,006 | 8/1961 | Johnston | 126/271 |
| 3,001,331 | 9/1961 | Brunton | 50/192 |
| 3,039,453 | 6/1962 | Andrassy | 126/271 |
| 3,207,211 | 9/1965 | Winterfeldt | 165/47 |
| 3,244,186 | 4/1966 | Thomason et al. | 135/1 |
| 3,366,168 | 1/1968 | Dale | 126/417 |
| 4,020,605 | 5/1977 | Zenos | 52/66 |
| 4,091,798 | 5/1978 | Fletcher et al. | 126/271 |
| 4,122,833 | 10/1978 | Lovelace et al. | 126/271 |
| 4,137,901 | 2/1979 | Maier | 126/271 |
| 4,224,923 | 9/1980 | Wells | 126/417 |
| 4,252,183 | 2/1981 | Ricciardelli | 165/47 |
| 4,261,417 | 4/1981 | Tingley | 165/47 |
| 4,291,673 | 9/1981 | Deutz | 126/417 |
| 4,333,444 | 6/1982 | Sell | 126/450 |

Primary Examiner—Daniel J. O'Connor
Attorney, Agent, or Firm—Kinney, Lange, Braddock, Westman & Fairbairn

[57] ABSTRACT

A solar heater includes an elongated solar collector having two fixedly connected solar panels of highly heat conductive material supported by a roof clamp on a shingled roof. The bottom edges of each of the solar panels include upturned gutter portions. One form of roof clamp for shingled roofs includes a J-shape shingle clamp member having a clamp bolt extending therethrough, and a solar collector clamp member assembled on the bolt and clamped to the bottom gutter portions of the solar panels. A bottom plate of the J-shape clamp member is slid under a shingle of a first shingle course and under a shingle of a second upper shingle course to carry the bolt into the top of the gap between adjacent shingle portions of the first course and to position a top plate of the shingle clamp member over parts of the shank portions of the first course and over a part of the one shingle of the second course. A clamp nut clamps the collector clamp member and the shinlge clamp member firmly to the contacted shingles.

13 Claims, 14 Drawing Figures

SOLAR HEATER AND ROOF ATTACHMENT MEANS

This application is a continuation-in-part of our application Ser. No. 375,366, filed May 6, 1982, now abandoned.

BACKGROUND OF THE INVENTION

1. Field of the Invention

This invention has relation to solar heaters useful for preventing and eliminating buildup of ice along the bottom edge of a slanted roof in a heated dwelling in geographical areas where snow tends to persist in the wintertime.

2. Description of the Prior Art

It is well known to use solar collectors having triangle-shaped cross sectional dimensions. For example, see:

| U.S. PATS. | | |
|---|---|---|
| 4,091,798 | Fletcher et al | 5/30/78 |
| 4,122,833 | Lovelace et al | 10/31/78 |
| 4,137,901 | Maier et al | 2/6/79 |

The patent to Brunton, U.S. Pat. No. 3,001,331, granted Sept. 26, 1961, discloses a collector having a plurality of solar heat processing members located in adjacent relation to each other, one member being substantially horizontal and of reflective nature, adjoined to an adjacent vertical member which is heat absorbent.

The problem solved by this invention is related to, and is compounded by, buildup of ice in roof gutters. Strips of metal attached to the gutters to conduct solar heat to the gutter are shown in U.S. Pat. No. 3,207,211 to Winterfeldt, granted Sept. 21, 1965.

Roof gutters and roof edges can also be kept free of icicles by use of an elongated heating element 18 as shown in U.S. Pat. No. 2,111,251 to Spilsbury, granted on Mar. 15, 1938.

The patent to Deutz, U.S. Pat. No. 4,291,673, discloses a passive solar roof ice melter which is triangular in cross sectional dimension and which receives the sun's heat rays through a vertical window, these rays reflecting from a slanting surface down toward the surface of the roof where they pass through another glass to impinge on an upper heat absorbing surface of a horizontal bottom plate which is designed to rest on the roof. The Deutz device is designed to dangle from a support wire in position overlying the bottom edge of a slanted roof structure.

A search of the specific structure set out in the specification which follows was not made. Applicants and those in privity with them are aware of no prior art they believe to be closer than the patents set out above. They are aware of certain other patents related to solar heating which they do not believe are particularly pertinent to the present invention. These patents are:

| | | |
|---|---|---|
| 2,780,415 | Gay | 2/5/57 |
| 2,998,006 | Johnston | 8/27/61 |
| 3,039,453 | Andrassy | 6/19/62 |
| 3,244,186 | Thomason et al | 4/5/66 |
| 4,020,605 | Zenos | 5/3/77 |

Applicants and those in privity with them are aware of no prior art which anticipates the claims herein.

SUMMARY OF THE INVENTION

A solar heater includes an elongated solar collector having two fixedly connected solar panels of heat conductive material supported in angular relationship with respect to each other in closely spaced relationship and above a slanted roof, the panels together forming the legs of a triangle when viewed in cross section. Each of the legs has as its bottom outer edge an upturned and outwardly extending gutter.

At least one shingled roof clamp is provided to fixedly position the solar collector with respect to the roof so that the collector extends generally upwardly away from the bottom edge of the roof with its lowermost edge substantially in alignment with or slightly overlying the bottom roof edge.

The shingled roof clamp includes a shingle clamp member which has a bottom plate adapted to slide under the bottom surface of parts of at least two courses of shingles. In one form there is also a top plate parallel to, slightly spaced from and integrally connected with the bottom plate along the lower edge thereof, the top plate being provided with a clamp bolt opening therethrough for receiving a clamp bolt which extends upward from fixed relationship with respect to the shingle clamp bottom plate. In another form the top plate is omitted.

In each form of the invention as shown, the shingled roof clamp also includes a solar collector clamp member consisting of a base plate having a clamp bolt opening therethrough, and upwardly and outwardly extending solar panel gutter receiving members at opposite ends of the base plate, and gutter retaining members at outer ends of the gutter receiving members.

To install the solar heater, the first form of shingled roof clamp is assembled with the clamp bolt extending upwardly from the shingle clamp bottom plate through the shingle clamp top plate and the base plate of the solar collector clamp member. The shingle clamp bottom plate is slid at the appropriate location up under a lower first course of shingles with the parts so positioned that the roof clamp bolt extends into the space between adjacent bottom exposed shingle portions of this first course of shingles. The shingle clamp bottom plate extends up under a second upper course of shingles until the clamp bolt reaches the top of the space between the adjacent shingle portions of the lower first course. A roof clamp nut is tightened on the roof clamp bolt to fixedly position the shingled roof clamp with respect to the roof.

With the shingled roof clamp of any form of the invention installed on a shingled roof, the adjacent solar panels of the solar collector are then slightly compressed to bring the gutters of the solar panels inside of the upwardly extending gutter receiving members of the solar collector clamp member, and are then released to spring back against these gutter receiving members. The gutter retaining members can then be crimped or clamped down over the gutters to fixedly position the solar collector with respect to the roof.

All outer surfaces of the solar panels and roof attachment means can be painted or otherwise treated to render them heat absorbent to a maximum degree. Inner surfaces under the solar panels will be left untreated or will be treated to achieve maximum reflectiveness to expedite transfer of radiant energy from the solar collector to the shingles on the roof. In one form of the invention, these inner surfaces can be covered with insulating materials to reduce heat losses from the solar panels by convention due to wind blowing through the tunnel formed by the panels.

It is believed that the solar heater of the invention works primarily by conduction once the radiant energy is absorbed by the heater and the roof attachment means. The solar panel gutters and also the roof clamp for shingled roofs tend to act as heat sinks as does the surface of the roof under the solar heater. The effect of the solar heater of the invention is not unlike the "hot house" effect created inside of a closed automobile when it is parked, either in the winter or the summer, in the direct sunlight.

The temperature of the solar panels in adjacent relation to the gutters is found to be warmer than higher up on the panel. Except for a brief period each day, the sun will be related to the solar heater in such a manner that one of the solar panels receives more radiant energy than the other. The transfer of heat by conduction from one panel to the other is facilitated by the solar collector clamp members attachment to the gutters of each of the panels.

The "hot house" effect of the solar heater of the invention can be increased by installing end caps on one or both ends of the solar collector, these caps being situated in spaced relation to the roof so as not to inhibit flow of melted ice or snow from beneath the solar heater.

DETAILED DESCRIPTION OF THE PREFERRED EMBODIMENTS

A solar heater 10 of a first form of the invention includes a solar collector 12 and a roof attachment means or shingled roof clamp 14. While the solar heater 10 will be effective to accomplish its intended purpose if it were supported above any slanted roof in adjacent relation to the bottom edge of that roof, the structure of the invention is designed to be particularly effective and useful when it is installed on a slanted shingled roof 16 of a heated enclosure such as house 18. As perhaps best seen in FIGS. 3 and 5, bottom exposed shingle portions 20 of each horizontally extending shingle course 22 are separated from each other by a shingle gap 24. As an aid to explaining the invention, the relationship of the uppermost shingled roof clamp 14 will be discussed with reference to a first lower shingle course 26, and a second upper shingle course 28 overlying the first course. Although the lowermost roof attachment means or shingled roof clamp 14 is shown as being clamped on the lowermost courses of the shingled roof 16, it is to be understood that it could be installed farther up the roof as suggested in FIG. 3 should this be desirable for any particular reason.

The solar collector 12 includes a pair of integrally connected elongated solar panels 30,30 made of a resilient material which is highly heat conductive, such, for example, as aluminum. Each panel 30, along its bottom edge, is provided with an outwardly and upwardly extending gutter 32.

The solar panels 30,30, when viewed in cross section form the legs of an isosceles triangle. See FIGS. 4 and 6. This isosceles shape is preferred for a number of reasons, including interchangability of parts, ease of storing and packing for shipment, etc. However, in specific instances, the angular relationship of one of these panels can be different from that of the other panel with respect to the roof, without violating the spirit of the invention and the scope of the claims which follows.

The roof attachment means or shingled roof clamp 14 includes a shingle clamp member 40, a solar collector clamp member 42, a clamp bolt 44 and a clamp nut 46.

The shingle clamp member 40 includes a bottom plate 48, and a top plate 50 parallel and spaced from the bottom plate by at least the thickness of one shingle, and integrally attached to the bottom plate as at 52.

Top plate 50 is provided with a clamp bolt opening 54 therethrough. In the form of the invention as shown, the clamp bolt 44 is in the nature of a carriage bolt, and extends through a square bottom plate clamp bolt opening 64.

The solar collector clamp member 42 consists of a single elongated sheet bent twice at each end to provide a solar collector clamp base plate 66, a pair of upwardly and outwardly extending solar panel gutter receiving members 68,68, one at each end of the base plate, and at outer ends of these gutter receiving members, a pair of solar panel gutter retaining members 70,70, each extending inwardly from an outer end of one of the gutter receiving members. The base plate 66 has a clamp bolt opening 67 therethrough.

A plurality of holes 72 extend through the solar collector clamp member 42 in alignment with the junction of each gutter receiving member 68 and its gutter retaining member 70. This is to weaken the clamp member at that point to allow the gutter retaining members 70 to be bent downwardly in a manner to be described.

The solar heater of the present invention can be installed at any time of the winter or summer; but it will be particularly convenient and efficient if it is installed on a shigled slanted roof at a strategic location adjacent the bottom edge of the roof well before inclement winter weather sets in.

When ice builds up along the bottom edge of a slanted shingled roof, usually underneath the snow on the roof, it forms a dam. This dam is most apt to form on the lower edge of the roof out beyond the part of the roof which is over the enclosed heated attic space. Because of radiation from the sun acting on snow and because of the heat being lost through the roof of the building acts to melt the snow on the underheated portion of the roof, the water so formed runs down on top of the shingles and under the remaining snow on the roof. When this water reaches the part of the roof which extends outwardly from the building, the "heat sink" effect of the building itself is lost, and the water will often turn to ice. Subsequent water hits this initially tiny ice dam along the lower edge of the roof, has nowhere to go, so in turn freezes, thus building up a large ice dam along the entire length of a particular run of roof. Most of the damage to houses in this situation is caused by additional water forming above the ice dam, and having nowhere else to go, seeping back underneath the shingles, through the roofing and down into the house. If there is a barrier in connection with insulation under the roof, for example, the water soaks along this barrier until it finds access through a lighting fixture or through some other kind of a discontinuity to seep through. Also, water can pass between the joint between the interior ceiling and the outside wall, and so can ruin the wallboard, the wallpaper, or other finish inside of the room.

Whether or not the water gets inside of the room in this manner, it will soak down into the insulation and thus destroy or greatly reduce its insulation value. The presence of water in the walls will also tend to cause rotting and other damage in the walls.

As water forms above the ice dam, it tends to run laterally to try to run off the end of the roof. Typically, however, the end of the roof overhangs the end of the house, so that water traveling laterally to the edge of the roof also freezes and forms an even higher ice dam on the roof edges, thus creating a virtual bathtub effect to permit the water to seep back under the shingles and into the house as explained above.

In order to defeat this ice dam and to drain off the water which would ordinarily seep up underneath the shingles, it is usually necessary to have only one or two passive solar heaters fastened to the roof during the winter season. These heaters will act to keep an elongated strip of roof and shingles at a temperature above freezing so that any water trapped by an ice dam can run laterally to and under the solar heater to pass harmlessly over the edge of the roof and onto the snow below.

Because the ultraviolet and infrared rays of the sun permeate through to the solar heater even on cloudy days, the heater will be effective in the majority of situations. When the sun goes down, the solar heater can no longer be effective, but, at the same time, there can no longer be any melting of water due to solar action. As the temperature drops at night, even the loss of heat up through the roof is neutralized so that there is no further tendency for the snow layer to melt to form water. There is no need, then, for the solar heater since there is no moisture in the form of water on the roof. When the sun again comes up and, consequently, the temperatures moderate, the solar heater will again be effective to warm the shingles beneath it, and water forming above the ice dam will be effectively drained away without damage to the building beneath the shingles and beneath the roof.

With the above factors in mind, the householder will determine where the solar heater or solar heaters are to be placed. He will then install at least one and preferably two of the shingled roof clamps 14 on shingle courses at appropriate distances apart. To install a roof clamp 14, the solar collector clamp member base plate 66 is assembled with its collector clamp bolt opening 67 in alignment with the top plate clamp bolt opening 54 and the square bottom shingle clamp bolt opening 64. Clamp bolt 44 is inserted through those openings so that the square portion of the bolt shank is seated in the bottom bolt opening 64. The clamp nut 46 can be assembled loosely onto the bolt 44 to keep the parts in position.

The shingle clamp bottom plate 48 will then be slid under the shingles of a first lower shingle course 26 in position so that the bolt 44 aligns with the gap 24 between adjacent shingles of that course, and the entire shingled roof clamp 14 will be slid up along the roof until the bolt 44 comes in contact with the top of the gap 24 and/or with the bottom edge of the shingles of a second upper course 28. When in this position, the nut 46 will be tightened down hard against the solar collector clamp member 42 to firmly anchor the shingled roof clamp 14 against movement in direction parallel with the surface of the roof.

A second shingled roof clamp 14 will be similarly installed so that the axes of the bolts 44 of these two clamps will lie in a vertical plane in alignment with the desired final longitudinal axis of the solar collector 12.

If desired, this installation of the roof clamps 14 can be considered as a permanent one. Assembly of the solar collector 12 cna be deferred until a later date when severe winter weather is more imminent.

To install the solar collector 12, the somewhat resilient solar panels 30,30 are pressed toward each other sufficiently to allow the gutters 32 to pass vertically between the gutter receiving members 68 and gutter retaining members 70 of the solar collector clamp member 42. When in the proper position, the solar panels 30,30 will be allowed to expand to take position with respect to the gutter receiving members 68 and the gutter retaining members 70 as seen to the left in FIG. 4. When the solar collector 12 is situated in the proper longitudinal relationship with respect to the roof clamps 14, the solar panel clamp gutter retaining members 70 can be bent down by hand or using a pliers, aided by the weakness caused by the presence of the openings 72, to a position as seen to the right in FIG. 4 fixedly trapping the gutters 32.

Figures 1, 2:
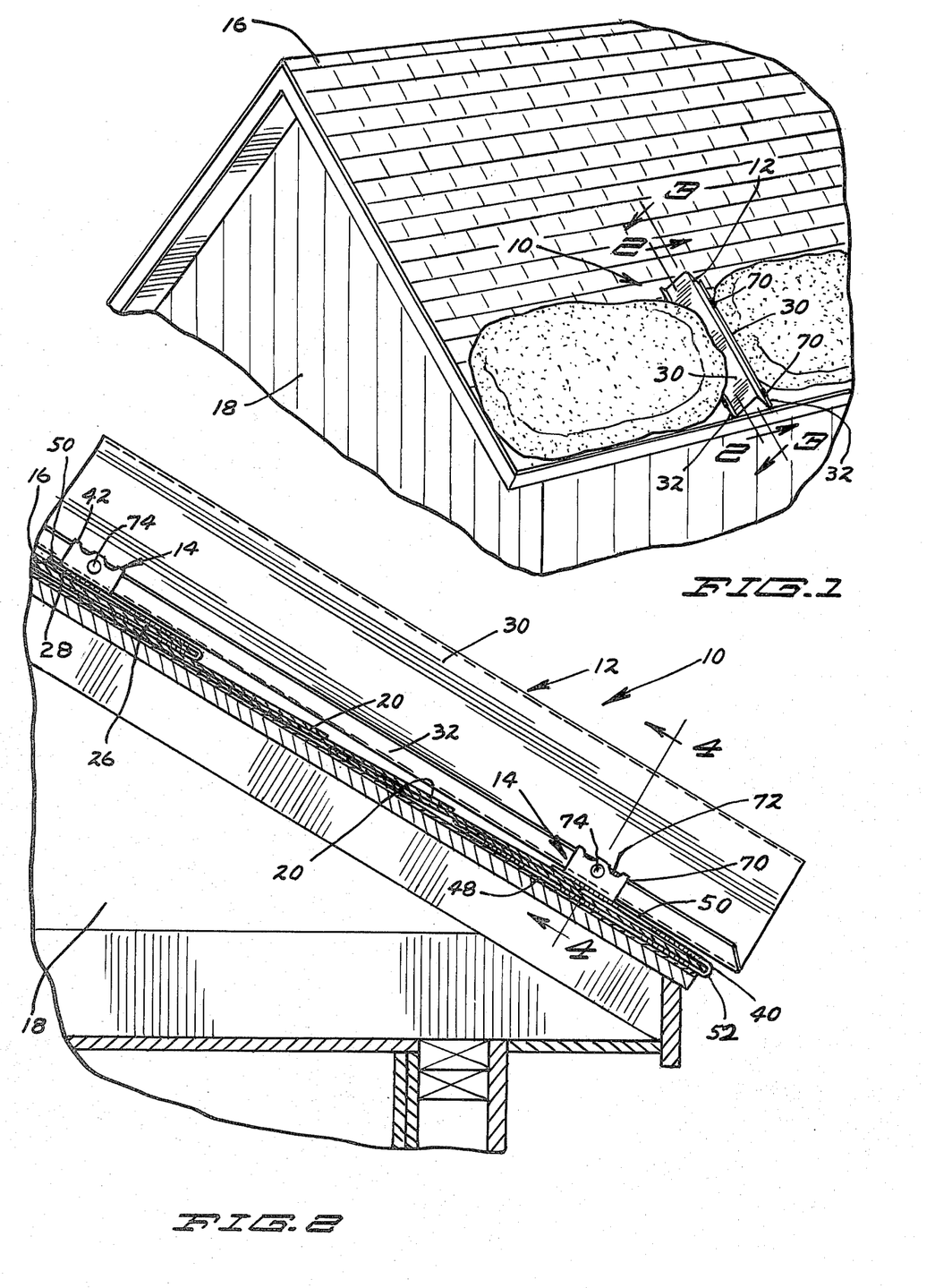
FIG. 1 is a fragmentary perspective view of a heated house with a first form of solar heater of the invention installed thereon and illustrating somewhat schematically the relationship of a snow and ice dam to the heater.
FIG. 2 is a side elevational view of the solar heater of FIG. 1 and is a fragmentary cross sectional view of the house and roof of FIG. 1.

In order to give even more stability against longitudinal movement, either the gutter receiving members 68 or the gutter retaining members 70 can be provided with dimples 74 which, when forced against the gutters 32, will prevent longitudinal movement of the solar collector 12 with respect to the solar collector clamp members. This is illustrated in FIGS. 2 and 7 as to dimples 74 in the gutter receiving members 68.

Figures 3, 4, 5, 6, 7:
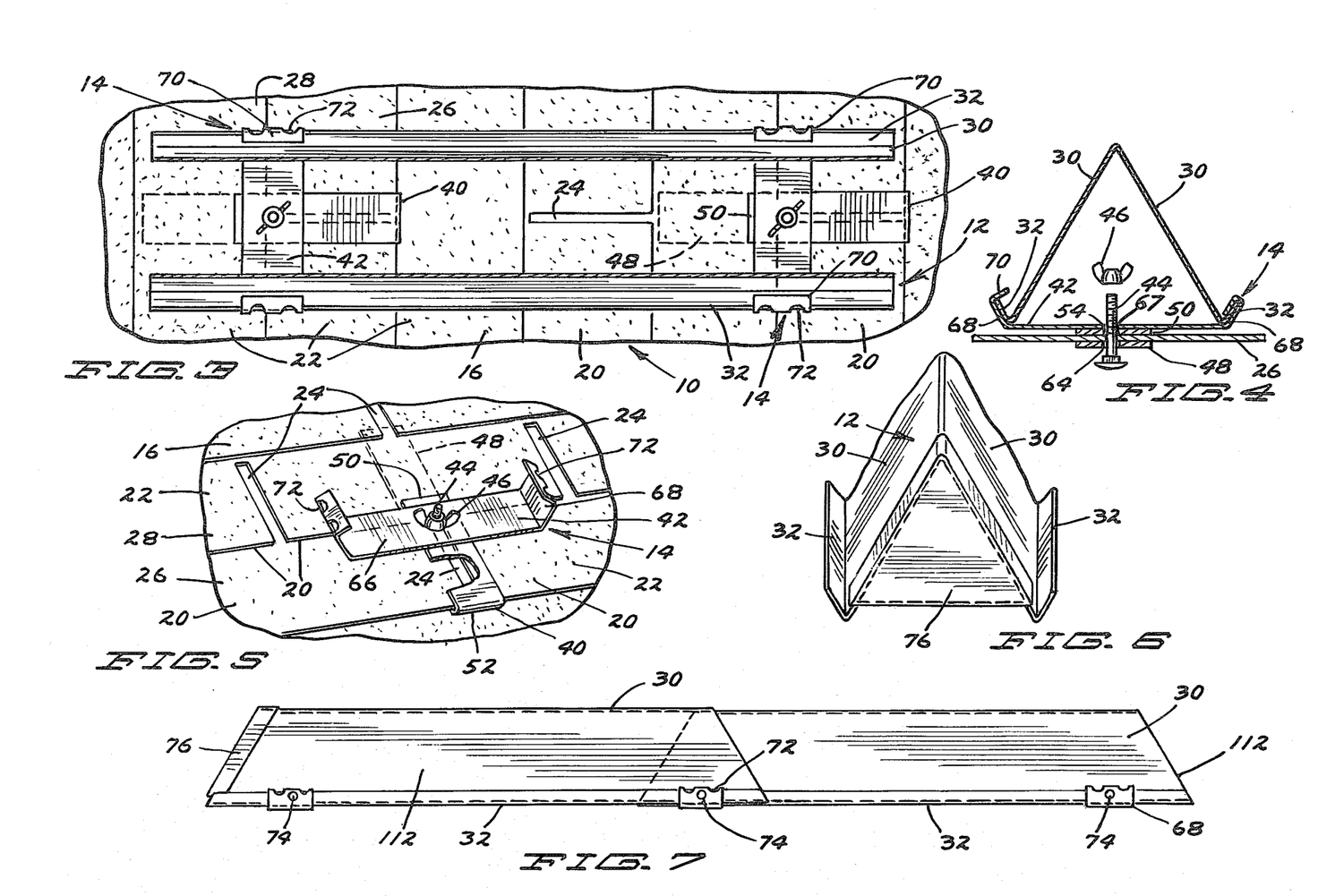
FIG. 3 is an enlarged sectional view taken on the line 3—3 in FIG. 1.
FIG. 4 is an enlarged sectional view taken on the line 4—4 in FIG. 2.
FIG. 5 is a frangmentary perspective view of a shingled roof with a roof attachment means or shingled roof clamp installed thereon.
FIG. 6 is a fragmentary perspective end view of a portion of a solar collector of the solar heater of the invention with an end cap installed thereon.
FIG. 7 is a side elevational view of two solar collectors assembled in accordance with a second form of the invention, these two solar collectors being fastened together using multiple roof attachment means to form a single solar heater having a greater capacity for absorbing radiant energy, for use on a north facing side of a roof, for example.

Once the snow comes, the solar energy available will be absorbed by the outer heat absorbing surfaces of the solar panels 30 of the solar collector 12, and the heat will be conducted down toward and to the gutters 32, which, as best seen in FIG. 4, are situated above the top of the shingles only by the thickness of the shingle clamp top plate 50.

The heat is radiated from the interior surfaces of the solar panels 30 down against the shingles, causing a "hot house" effect and, in all but the most severe circumstances, bringing the temperature of the shingles up above freezing. Similarly, snow coming in contact with the solar collector will melt and run down to the gutters 32 where it will run off over the edge of the roof harmlessly onto the snow below. Likewise, moisture arriving inside of the tunnel formed by the solar panels 30 will pass down the shingles and harmlessly over the side of the roof.

A unique aspect of the present invention over the prior art is the collection of solar energy in the solar panels 30,30 and the transmission of this energy into a sheltered tunnel and directly down on the shingles themselves. Prior art devices rely on heating some kind of a substrate between the solar collectors and the shingle area to be heated, thus losing a large measure of the effectiveness of the solar energy impinging on the heater.

As seen in FIG. 6 and FIG. 7, the "hot house" effect can be enhanced by installing a solar collector cap 76 on one or both ends of the solar collector 12.

When the snow builds up on either side of the solar heater as suggested somewhat schematically in FIG. 1, the heater operates in a valley created by the channel it has maintained between the snow banks. This "valley" protects the heater from winds along the top of the roof, and this substantially reduces loss of solar heat by convection.

As to houses having substantial northerly roof areas, it is sometimes desirable to use multiples of the solar panels used on roof surfaces facing in directions to more easily receive the rays of the sun during the winter months. This is done very simply as illustrated in FIG. 7. Here, in a second form of the invention, two modified solar collectors 112, 112 are fastened together by the simple expendient of providing three shingled roof clamps 14 in alignment with each other, by nesting one of the solar collectors 112 inside of the other so that there is a substantial overlap, and then by depressing solar panels 30,30 of solar collectors 112,112, inserting their gutters 32 into the gutter receiving members 68 and the gutter retaining members 70 of the solar collector clamp member 42, and fastening the gutter retaining members 70 down on the gutters 32 in the manner described above.

End caps 76 can be positioned at one or both ends of the resulting combined solar collector, but no cap or other impediment will be set up between the outer ends of the combined solar collector so that the temperature inside of the entire combined collector will equalize, thus insuring that there will be sufficient heat distribution to cause the solar heater to function properly.

Solar collector clamp members 42 and end caps 76 serve to conduct heat collected on a first of the solar panels 30 across to a second panel 30 in situations where most of the sun is impinging on the first panel.

Heat collected by the gutters 32 and heat transmitted by conduction from the panels 30 to their gutters 32 will tend to maintain any snow or ice arriving at the gutters and flowing down the gutters in a liquid state. This will augment the major inside drain path down the face of the covered shingles.

At the end of the winter season, the solar collectors of both forms of the invention can be left permanently in place on the rooftop, or can be removed. To most easily remove them, a screwdriver or similar tool can be used to pry the gutter retaining members 70,70 up slightly away from the gutters 32. This will allow the entire solar collector 12 to be slid longitudinally out from the solar collector clamp members 42. When the time comes to install the solar collectors on the roof once again, they can be installed either by the method first described above, or by sliding them longitudinally into the gaps provided between the gutter receiving members 68 and the gutter retaining members 70. When the solar collectors are properly positioned, the gutter retaining members can once again be clamped down on the gutters.

While the roof attachment means or shingled roof clamps 14 have been described as parts of a solar heater for use in positioning solar collectors 12 in fixed relationship with respect to the shingles of the roof, it has been found that such a clamp is effective in withstanding stresses in shear in the plane of the roof in all directions. In addition to use as described above, for which the clamp was originally developed, it will be effective for supporting longitudinally extending boards for use by roofers in applying new roofs above the level of shingles which they have initially installed by standing on scaffolds and/or ladders along the bottom edge of the roofs. These clamps 14 will also be satisfactory for firmly supporting roof mounted air conditioners.

An obvious advantage of a roof clamp made in accordance with the present invention is that it does its holding on the shingles themselves and distributes the holding forces over a large number of roofing nails passing through the several shingles with which the clamp is in contact. For such installations, the clamp can be made considerably wider with several bolts like the clamp bolt 44 extending up between shingle gaps 24 between a number of shingle portions of a particular first lower shingle course such as course 26.

A third form of the invention is disclosed in FIGS. 8 through 14. In this form of the invention, a solar heater 210 includes a solar collector 212 which in turn includes solar panels 230,230. Each panel 230 has a ridge lip 231 extending downwardly and inwardly away from its top longitudinal edge, and an outwardly and upwardly extending gutter 232 along its bottom longitudinal edge. The solar panels 230 are identical in shape with respect to each other, and are held together in fixed, integral, end-for-end, heat transferring relation with respect to each other by spring clips 233. Each solar panel 230 has a panel 234 of insulating material adhered to the underside thereof. Many kinds of insulating materials could be used, but panels of 65 pound roofing felt will serve adequately for the purpose.

Figures 8, 9, 10, 11:
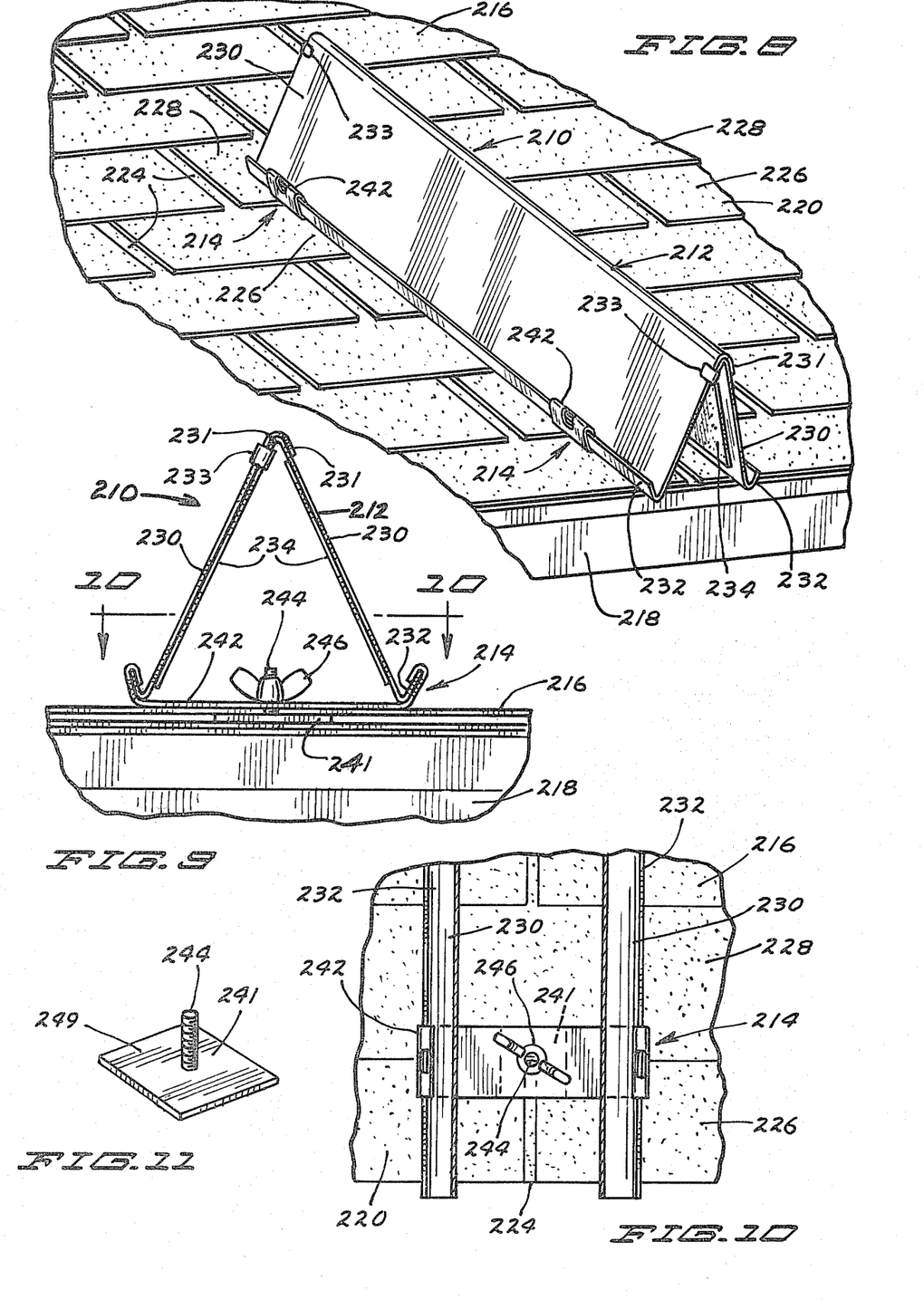
FIG. 8 is a fragmentary perspective view of a shingled roof of a heated house with a third form of solar heater installed thereon.
FIG. 9 is an enlarged end view of the solar heater and a fragment of the roof of FIG. 8.
FIG. 10 is a fragmentary sectional view taken on the line 10—10 in FIG. 9 but at a somewhat reduced scale.
FIG. 11 is a perspective view of a modified form of shingle clamp member.

As seen in FIGS. 8, 9 and 10, solar heater 210 can be installed on a slanted shingled roof 216 of a heated house 218 in much the same manner as solar heater 10 is installed on slanted shingled roof 16 of a heated house 18 in connection with the first form of the invention.

Where the roof attachment means or shingled roof clamp 14 of the solar heater 10 includes a J-shape shingle clamp member 40 having a bottom plate 48 extending under first and second horizontal shingle courses and a top plate 50 extending on top of portions of these two courses, a roof attachment means or clamp for shingled roof 214 includes instead a shingle clamp member 241 consisting of a rectangular shingle clamp plate 249 to which a roof clamp bolt 244 is fixedly attached as by spot welding, for example.

The remainder of the clamp for shingled roof 214, namely a solar collector clamp member 242 and a clamp nut 246, can be substantially identical with their counterparts in the first form of the invention, solar collector clamp member 42 and clamp nut 46, respectively.

The roof attachment means or shingled roof clamp 14 of the first form of the invention provides, with its narrow or widened shingle clamp member 40 an ability to support very heavy loads on a shingled roof for many purposes as carefully brought out above. However, because the load placed on the shingles by the solar heaters 10 or 210 is relatively light, it was found expedient to go to the shingle clamp member 241, as clearly shown in FIG. 11, in place of the shingle clamp member 40.

To install the solar heater 210, the shingle clamp member 241 is slid underneath a first lower shingle course 226 to position the roof clamp bolt 244 at the top of a shingle gap 224 between bottom exposed shingle portions 220 of first course 226. This will position the shingle clamp member 241 entirely under the first course shingles and partially under a shingle of a second upper shingle course 228. At this point, the clamp nut 246 and the solar collector clamp member 242 will be in position as explained in connection with nut 46 and member 42 of the first form of the invention. The roof clamp nut 246 will be tightened down on the roof clamp bolt to firmly secure the roof attachment means or clamp for shingled roof 214 in position.

Once another such clamp for shingled roof is properly positioned, the solar heater 210 will be installed in precisely the same manner as set out in connection with the first form of the invention.

Connecting solar panels 230,230 together with spring clips 233 after the solar heater 210 of the invention reaches the job site rather than constituting these two panels as one integral piece has the advantage of allowing a disassembled kit of the parts of the solar heater to be packed more compactly for shipment; and, perhaps more important, allows the solar panels 230 to be disassembled from one another, one of them turned end for end, and then nested for storage by the householder during the summer season in a condition where there is minimum chance of damage, and where the storage space required is at a minimum.

One important place to install a solar heater of the invention is in the valley formed by the intersection of two areas of slanted shingled roof. A further modification to the roof attachment means or clamp for shingled roof has been made to accommodate this situation, and this modification is disclosed in FIGS. 12 through 14. In these figures, the solar collector 212 as shown and described in connection with FIGS. 8 through 10 is mounted on intersecting roof panels 252 and 253 of a slanted shingled roof 216 of a heated house 218. In order to clamp the solar collector 212 into position, the same solar collector clamp member 242 shown in FIGS. 8 through 10 is used, but a further modified shingle clamp member 251 is employed.

Shingle clamp member 251 includes two rectangular shingle clamp plates 249 each having a roof clamp bolt 244 extending integrally upwardly therefrom, and two clamp nuts 246. A solar collector positioning strap 255 is provided with a central opening therethrough and is fastened to the solar collector clamp member 242 by the instrumentality of a solar collector clamp member bolt 257 and a third clamp nut 246. This solar collector positioning strap 255 has a plurality of roof clamp bolt receiving holes 259 therethrough.

To install the solar heater 210 in a roof valley, four rectangular shingle clamp plates 249 will be installed at appropriate locations, two on roof panel 252 and two on roof panel 253, each plate 249 to have its associated roof clamp bolt 244 projecting through a shingle gap 224 in a lower shingle course, and each shingle plate clamp 249 lying entirely under a lower course and partially under a bottom exposed shingle portion of an upper shingle course. Each one of a pair of solar collector positioning straps 255 will be assembled to a solar collector clamp member 242 by passing a solar collector clamp member bolt 257 through the central openings in the positioning strap 255 and in the solar collector clamp member 242 and turning clamp nut 246 down loosely on said bolt.

Figure 12:
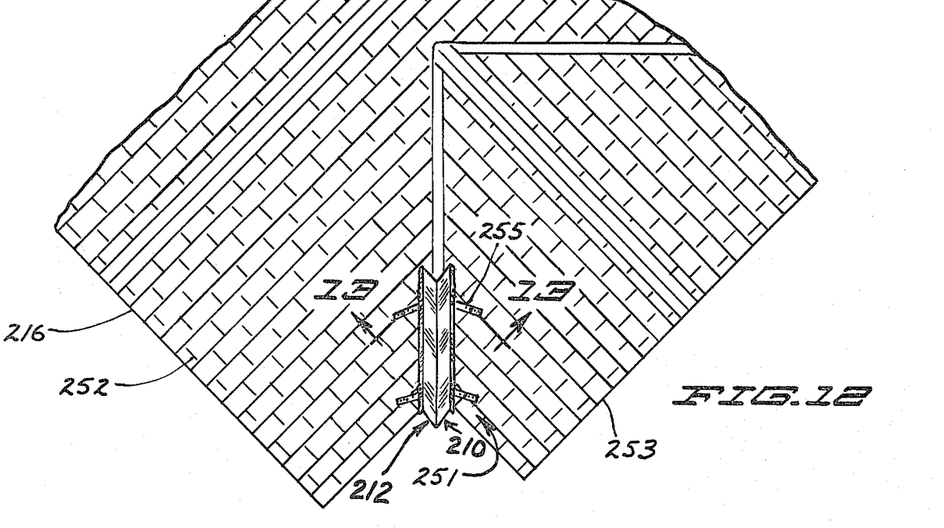
FIG. 12 is a fragmentary perspective view of a heated house including a roof valley and with a third form of solar heater of the invention installed thereon using a further modified form of roof attachment means or shingled roof clamp construction.

Each solar collector positioning strap 255 will now be assembled with two of the rectangular shingle clamp plates 249 by passing the roof clamp bolt 244 associated with each plate 249 through the appropriate roof clamp bolt receiving hole 259, and by then tightening one of the clamp nuts down on that roof clamp bolt 244. The appropriate positioning for the shingle clamp plates 249 and the solar collector positioning straps 255 to appropriately position the further modified shingle clamp member 251 is best seen in FIG. 12.

Figure 13:
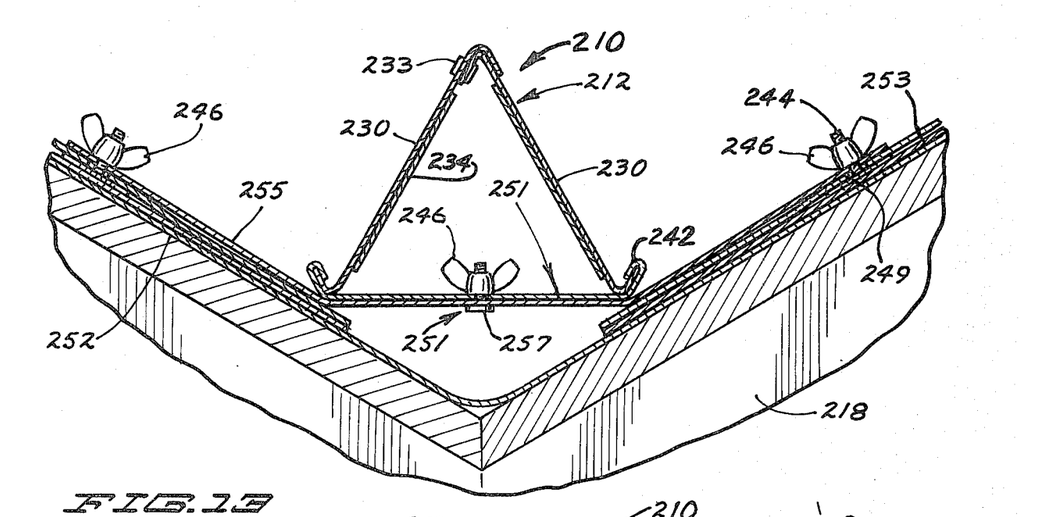
FIG. 13 is an enlarged sectional view taken on the line 13—13 in FIG. 12.
Figure 14:
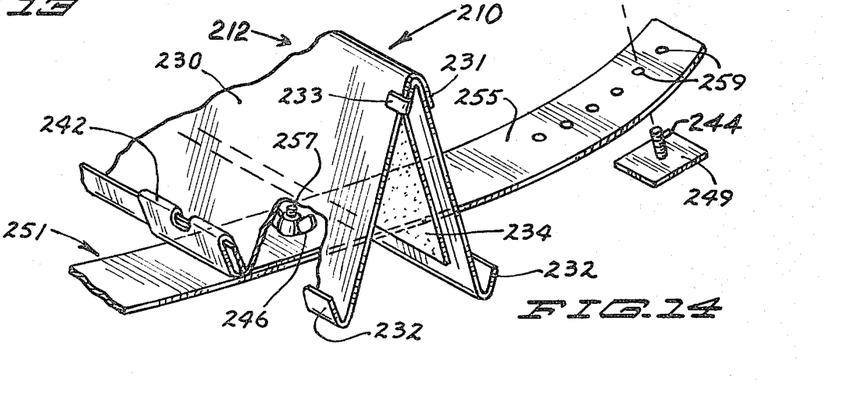
FIG. 14 is a fragmentary perspective view of the third form of solar heater and showing some of the details of the further modified form of roof attachment means or shingled roof clamp for use in installing solar heaters in roof valleys.

Once the further modified shingle clamp member 251, and more specifically, the solar collector clamp members 242 are appropriately placed, as seen in FIG. 13, the solar panels 230,230 can be compressed to install their gutter portions with respect to the solar collector clamp members 242, all as described in connection with solar panels 30,30 and solar collector clamp member 42 of the first form of the invention.

Although the present invention has been described with reference to preferred embodiments, workers skilled in the art will recognize that changes may be made in form and detail without departing from the spirit and scope of the invention.

What is claimed is:

1. A solar heater and deicer for use on a slanted roof includes:
   A. a solar collector including two elongated solar panels of heat conductive material fixedly connected to each other along first edges of each to lie in angular relation to each other;
   B. said panels each being provided with an upturned gutter portion along a second edge thereof parallel to and opposite the first edge;
   C. each gutter portion lying in acute angular relation to its panel and extending in direction away from the other panel; and D. roof attachment means to support the solar collector in slightly spaced, parallel relation to a slanted roof to have a first end of the collector in adjacent relation to a bottom edge of the roof and a second end of the collector higher up the roof.

2. The solar heater of claim 1 wherein:
E. insulating material is affixed to a major portion of the interior surface of each solar panel.

3. The solar heater of claim 1 wherein:
E. the solar panels are each provided with a ridge lip extending along the entire first edge thereof and extending outwardly in angular relationship to the panel at a side thereof opposite the gutter; and
F. said solar panels are fixedly connected to each other in that the ridge lip of each panel is held in fixed relationship to an adjacent upper portion of the other panel.

4. The solar heater of claim 3 wherein:
G. the ridge lips of each panel are held in fixed, heat transferring relationship with respect to upper portions of the other panel through the instrumentality of spring clips holding the ridge lip of at least one solar panel to upper portions of the other.

5. The solar heater of claim 1 wherein:
E. said slanted roof is covered with a plurality of horizontally extending courses of shingles, each shingle in a course having at least one bottom exposed shingle portion, said shingle portion being separated from its adjacent neighbors in that course by a space called a shingle gap; and
F. said roof attachment means is constituted as at least one shingled roof clamp, said roof clamp including:
  (1) a shingle clamp member attached to the roof, and
  (2) a solar collector clamp member attached at an intermediate portion thereof to said shingle clamp member and attached to a bottom gutter edge portion of each solar collector to lie in transverse relation to the elongated axis of the solar collector.

6. The solar heater of claim 5 wherein:
G. said shingle clamp member includes:
  (1) a bottom plate;
  (2) a clamp bolt extending upwardly from the bottom plate, and
  (3) a clamp nut operably associated with the bolt;
H. said solar collector clamp member includes a base plate having a clamp bolt opening extending therethrough; and
I. the relationship of the parts is such that when the bottom shingle clamp plate is slid under the first shingle course to carry the clamp bolt into and to the top of a shingle gap, the bottom shingle clamp plate will be in underlying clamping relation to at least two shingle portions of the first course and at least one shingle portion of a second upper course.

7. The solar heater of claim 6 wherein:
J. the solar collector clamp member includes a base plate, gutter receiving portions integral with and extending upwardly and outwardly from each end of the base plate, and gutter retaining portions extending integrally upwardly and inwardly from outer end portions of said gutter receiving portions;
K. the size, relationship and positioning of the parts being such that when the gutters of the solar panels are placed in contacting relationship with said gutter receiving portions of said solar collector clamp member, said gutter retaining portions are in position to be folded down over said gutters to restrain said solar collector panels against longitudinal movement with respect to said shingled roof clamp.

8. The solar heater of claim 1 wherein:
E. the solar panels are fixedly connected to each other in that they are integral with each other being made out of the same sheet of material.

9. The solar heater of claim 1 wherein:
E. said slanted roof is covered with a plurality of horizontally extending courses of shingles, each shingle in a course having at least one bottom exposed shingle portion, said shingle portion being separated from its adjacent neighbors in that course by a space called a shingle gap; and
F. said roof attachment means is constituted as at least one shingled roof clamp, said roof clamp including:
  (1) a shingle clamp member attached to the roof in generally perpendicular relation to the bottom edge of the roof, and
  (2) a solar collector clamp member attached at an intermediate portion thereof to an intermediate portion of said shingle clamp member and attached to a bottom gutter edge portion of each solar collector to lie in transverse relation to the elongated axis of the solar collector.

10. The solar heater of claim 9 wherein:
G. said shingle clamp member includes:
  (1) a bottom plate;
  (2) a top plate integrally connected to the bottom plate at lower ends of each and lying parallel to the bottom plate and spaced from it by at least the thickness of a shingle, said top plate being provided with a bolt opening therethrough,
  (3) a clamp bolt extending upwardly from the bottom plate through the top plate bolt opening, and
  (4) a clamp nut operably associated with the bolt;
H. said solar collector clamp member includes a base plate having a clamp bolt opening extending therethrough; and
I. the relationship of the parts being such that when the bottom shingle clamp plate is slid under the first shingle course to carry the clamp bolt into and to the top of a shingle gap, the top shingle clamp plate will be in overlying clamping relation to, and the bottom shingle clamp plate will be in underlying clamping relation to, at least two shingle portions of the first course and at least one shingle portion of a second upper course.

11. The solar heater of claim 10 wherein:
J. the solar collector clamp member includes a base plate, gutter receiving portions integral with and extending upwardly and outwardly from each end of the base plate, and gutter retaining portions extending integrally upwardly and inwardly from outer end portions of said gutter receiving portions;
K. the size, relationship and positioning of the parts being such that when the gutters of the solar panels are placed in contacting relationship with said gutter receiving portions of said solar collector clamp member, said gutter retaining portions are in position to be folded down over said gutters to restrain said solar collector panels against longitudinal movement with respect to said shingled roof clamp.

12. The solar heater of claim 11 wherein:

L. the material of said solar collector clamp member is cut away in the vicinity of the attachment of said gutter retaining members to said gutter receiving members to make it easier to deform said gutter retaining members down against said gutter.

13. The solar heater of claim 11 wherein:

L. at least one of said gutter receiving members and gutter retaining members is provided with an indentation or dimple in direction toward its solar collector gutter to enhance the gripping power of said gutter retaining and receiving members against longitudinal movement of the solar collector panels after the gutter retaining members have been clamped down on the gutters.

* * * * *